United States Patent
Glass et al.

[11] Patent Number: 6,074,059
[45] Date of Patent: Jun. 13, 2000

[54] SUNGLASSES WITH REMOVABLE LENSES

[76] Inventors: Theodore A. Glass, 3666 N. Miller Rd.; Tom M. Sherman, 4730 E. Indian School Rd., #120; Gary W. Hall, 2501 N. 32$^{nd}$ St., all of Phoenix, Ariz. 85018

[21] Appl. No.: 09/050,843

[22] Filed: Mar. 30, 1998

[51] Int. Cl.$^7$ .................................................. G02C 1/00
[52] U.S. Cl. ................................................. 351/86; 351/83
[58] Field of Search .................................. 351/86, 41, 44, 351/106, 83, 103, 90, 92

[56] References Cited

U.S. PATENT DOCUMENTS

| | | | |
|---|---|---|---|
| 1,520,977 | 6/1924 | Stevens | 351/86 |
| 1,659,165 | 1/1928 | Sangren | 351/86 |
| 3,453,042 | 7/1969 | Cooper | 351/86 |
| 3,475,083 | 10/1969 | Gitlin et al. | 351/41 |
| 3,838,914 | 10/1974 | Fernandez | 351/106 |
| 4,153,347 | 5/1979 | Myer | 351/90 |
| 4,304,469 | 12/1981 | Solomon | 351/121 |
| 4,357,080 | 11/1982 | Solomon | 351/86 |
| 4,523,819 | 6/1985 | Dianitsch et al. | 351/106 |
| 4,689,838 | 9/1987 | Angermann et al. | 2/441 |
| 4,748,697 | 6/1988 | Hodnett | 2/438 |
| 4,759,622 | 7/1988 | Schimdthaler | 351/86 |
| 4,983,030 | 1/1991 | Chandler | 351/86 |
| 5,098,180 | 3/1992 | Tobey | 351/97 |
| 5,321,442 | 6/1994 | Albanese | 351/44 |
| 5,321,444 | 6/1994 | Lin | 351/86 |
| 5,467,148 | 11/1995 | Conway | 351/85 |
| 5,576,777 | 11/1996 | Gioacchini | 351/86 |
| 5,579,062 | 11/1996 | Sondrol | 351/92 |
| 5,587,747 | 12/1996 | Bernheiser | 351/105 |
| 5,602,603 | 2/1997 | Bondet | 351/41 |

*Primary Examiner*—Hung Xuan Dang
*Attorney, Agent, or Firm*—The Halvorson Law Firm

[57] ABSTRACT

The present invention relates to eyewear that provides replaceable and/or interchangeable lens for eyewear. The lens and frame set is adapted for the easy replacement and/or interchange of the removable lenses from a front side of the frame. In one embodiment, the lens is further secured into the frame from the front side by a resiliently compressible barrier that must be overcome in order for the lens to be received into and out of the frame. In another embodiment, the lenses are securable into the frame by friction from the front side, the friction arising between a resiliently compressible lens gasket that is attached to the periphery of the lens and an interior surface of the cross section of the bezel of eyepiece of the frame.

9 Claims, 5 Drawing Sheets

6,074,059

SUNGLASSES WITH REMOVABLE LENSES

FIELD OF THE INVENTION

The present invention relates to the field of sunglasses. More particularly, the present invention relates to the field of sunglasses that have interchangeable and/or replaceable lenses.

BACKGROUND

Eyewear, such as sunglasses, is worn during a wide variety of activities and must be capable of meeting numerous consumer demands. They must be conformable, aesthetic looking, durable, and inexpensive. However durable eyewear are made, their lenses are frequently scratched or broken. The replacement of the broken or otherwise damaged lenses, obviously, is less expensive than replacing the entire frame and lens set.

In addition to replacing damaged lenses, it is often desirable to modify the eyewear between indoor and outdoor use. Interchangeable lenses are also appealing to far-sighted individuals who do not like bifocals and prefer to change the lens in their frame between near and far vision applications. Finally, there is a wide variety of colors, designs and shapes of eyewear. Therefore, lens replacement would also allow for inexpensive color coordination and other stylistic statements.

Recently, eyewear has been developed having interchangeable lenses or lens assemblies, purportedly permitting simple replacement of lenses. Generally these lenses are unitary lenses attached to a temple member/frame. Other replaceable and/or interchangeable lens eyewear designs have been complex mechanical assemblies that are expensive to manufacture and difficult to assemble and use. Clip-on, or snap-in, lenses are a popular solution to the need for multiple lenses with a single frame. Clip-on lenses are attached to a pair of eyeglasses by a clip, or other mechanism, typically located at the center of the clip-on lenses. Typically, some additional structure is added to the eyewear for holding an additional lens or pair of lenses behind or in front of the eyewear lenses. Use of multiple lenses solutions can be disadvantageous because they frequently result in poorer optics. Furthermore, the may be cosmetically unattractive.

Another difficulty has been found in providing a reliable, readily interchangeable lens and frame set having a high quality frame without sacrificing the structural integrity of the frame. Interchangeable lenses currently provided in single-lens eyewear and in folding eyewear have highly resilient frame members, but a practical means has not been provided, until now, for allowing the rapid, yet reliable and secure, exchange of a high quality lens set in an attractive, high quality frame.

There is, therefore, a current and continuing need for a simple, relatively inexpensive lens replacement system that may be employed to support a pair of fashion or performance sunglass lenses that will provide for interchangeability or quick and cost effective replacement of the various lens types on a single frame.

SUMMARY OF THE INVENTION

It is an object of the present invention to provide a replaceable and/or interchangeable lens system for eyewear.

It is another object of the present invention to provide a lens and frame set that is adapted for the easy replacement and/or interchange of removable lenses.

It is a further object of the present invention to provide a replacably removable and/or interchangeable lens and frame set wherein the lens is press fit into the frame from a front side, said lens being further secured into the frame by a resiliently compressible barrier that must be overcome in order for the lens to be received by the frame.

It is yet another object of the present invention to provide a replaceable and/or interchangeable lens and frame set wherein the lenses are securable into the frame from the front side and are secured into the frame substantially by friction, the friction being between a resiliently compressible lens gasket, which is attached to the periphery of the lens, and an interior surface of the cross section of the eyepiece of the frame.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

FIG. 7a is a perspective cut-away illustrating one embodiment of the cross section of the eyepiece according to the present invention;

FIG. 7b is the cross section of the bezel of FIG. 7a;

DESCRIPTION OF PREFERRED EMBODIMENTS

Figure 2:
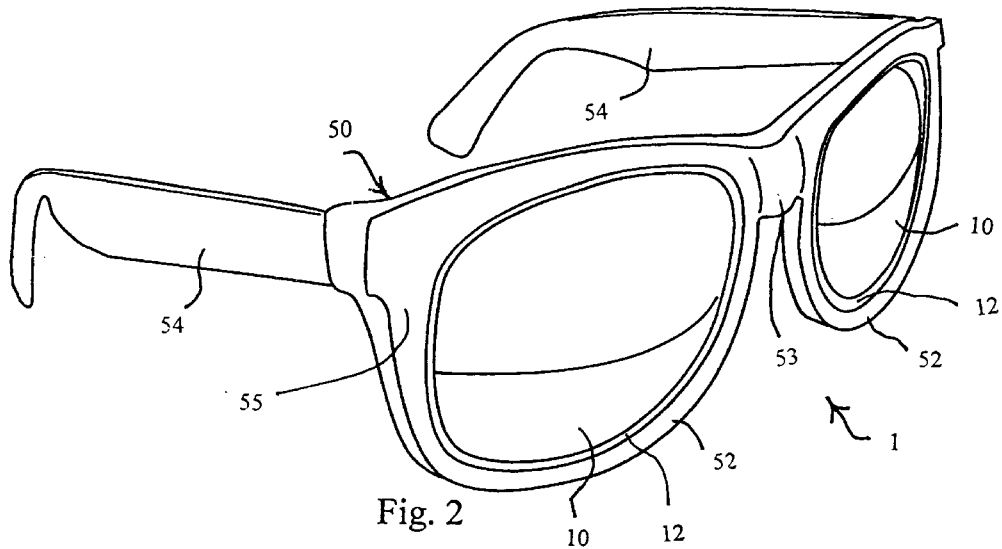
FIG. 2 shows the lens and frame set of FIG. 1 with both lenses received by the frame member.
Figure 1:
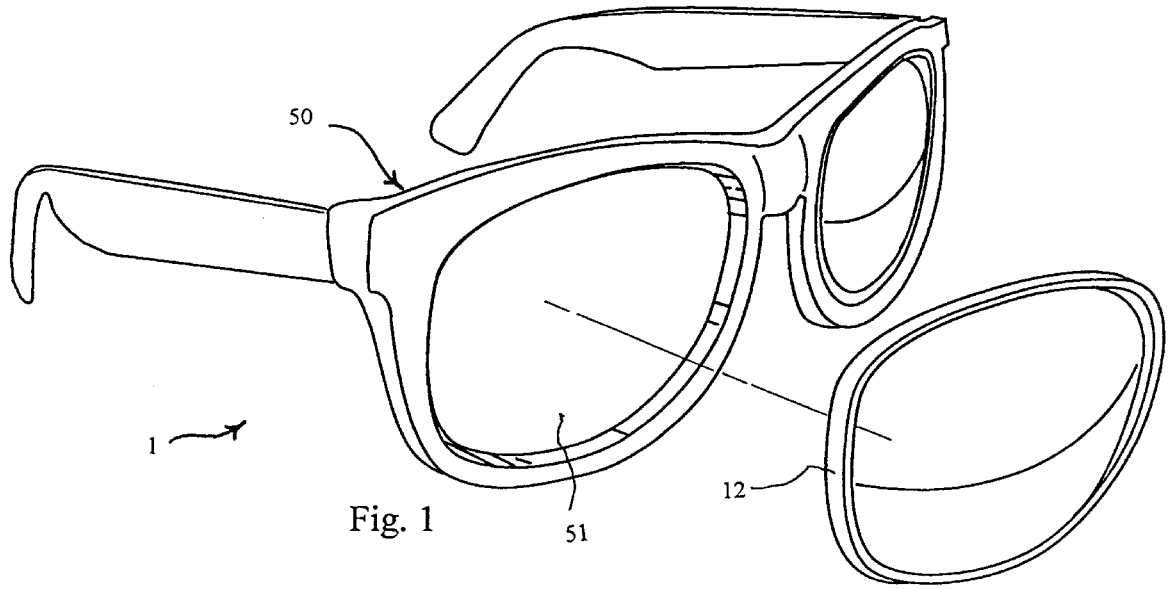
FIG. 1 illustrates how a lens according to one of the embodiments of the present invention is received by the frame member, one lens is separated from the frame in this figure.
Figure 3:
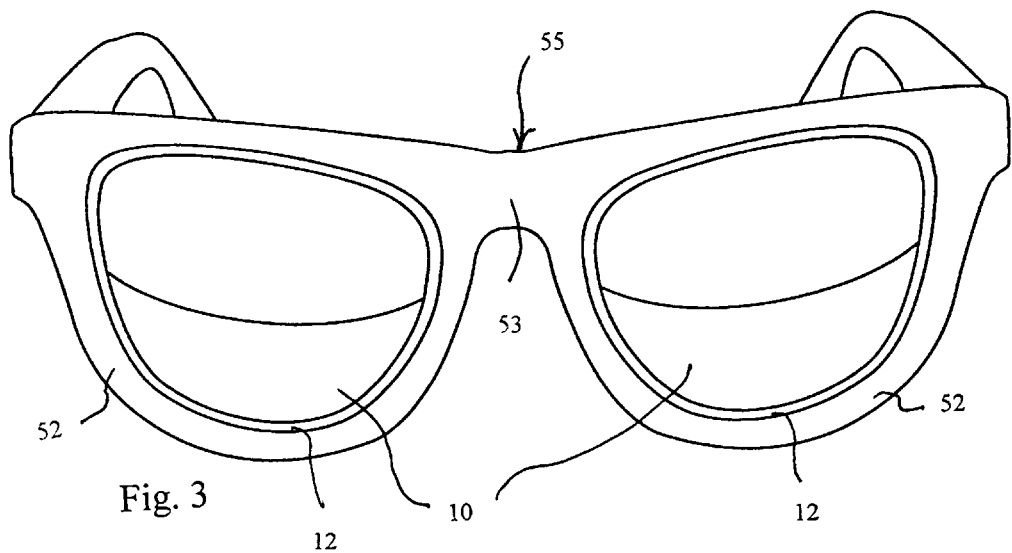
FIG. 3 is a front view of one of the embodiments of the lens and frame set according to the present invention.
Figure 4:
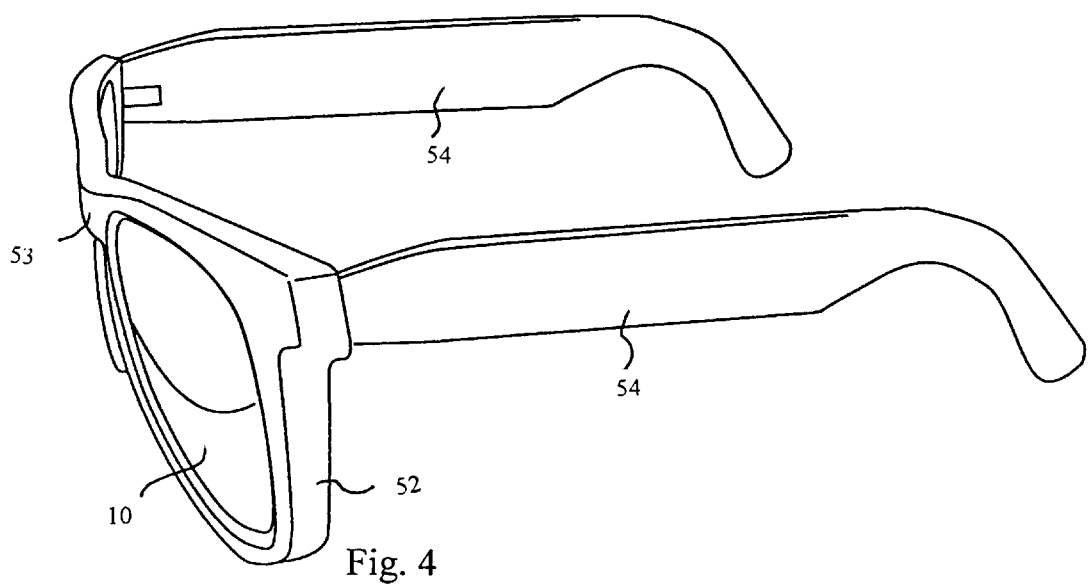
FIG. 4 is a side view of one of the embodiments of the lens and frame set according to the present invention.

Referring to the drawings, the present invention is an eyeglass frame and lens set, generally indicated as reference numeral 1, that is useful for the easy replacement and/or exchange of lenses in eyewear.

The eyeglass frame set 1 according to the present invention comprises a frame 50 with a frame member 55 having a pair of eyepieces 52 that are permanently or detachably attached to each other, preferably by a nose bridge 53 and at least one pair of lenses 10. It is common in the field for the eyepieces 52 and nose bridge 53 to be integrally formed or molded. There are also a pair of earpieces 54, or temple members, each pivotally attached to its own one of the pair of eyepiece 52, at opposed ends of the frame member 55. The eyeglass frame 50 may be manufactured from metal, plastic, elastomers, or various combinations of these.

The pair of eyepieces are 52 are substantially rigid, however, it is preferred that they have a slight amount of flexibility. More particularly, the eyepieces 52 are shaped like closed curves and define a lens opening 51 The shape of the eyepieces 52 range from circular to elliptic in shape, although other shapes are possible (such as rectangular, triangular, etc.) and fall within the scope of the present invention. The lenses 10 are receivable by and are adapted to fit into the lens opening 51 of the eyepieces 52, as will be further described below, and are removable and replaceable.

Figure 5:
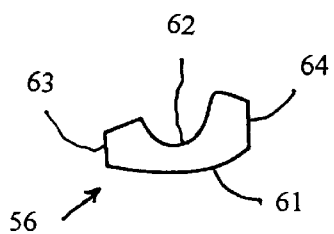
FIG. 5 is a cross section of the bezel according to the present invention.
Figure 6:
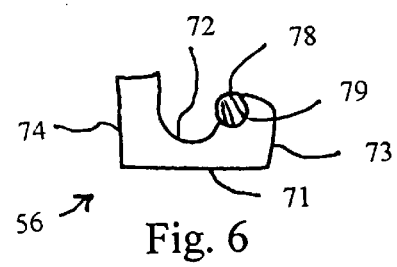
FIG. 6 is another cross section of the bezel according the present invention.

The eyepieces 52 have a cross-section 56 with a bezel that is adapted to receive the lenses 52, various embodiments of the bezel cross section are illustrated in FIGS. 5–7. According to one embodiment of the bezel, cross-section 56 comprises an external surface 61, an internal surface 62, a front surface 63 that extends between a first end of the external surface 61 and a first end of the internal surface 62, and a rear surface 64 that extends between a second end of the external surface 61 and a second end of the internal surface 62. The front and rear surfaces, 63 and 64, are comprised of at least one discrete sub-surfaces. FIG. 5 illustrates two discrete sub-surfaces for each front and rear surfaces 63 and 64. The intersection between the rear surface 63 and the second end of the inner surface 62 forms a first barrier having a certain height. The intersection between the front surface 64 and the first end of the inner surface 62 forms a second barrier having a height that is less than the height of the first barrier. Flexibility or resilience in the frame should, at the very least, occur around the second barrier.

In this embodiment, the lens 10 is pushed or forced into the bezel, over the second barrier. The first barrier is sufficiently high to prevent the lens 10 from being pushed all of the way through the frame 50. The second barrier, further, is of sufficient height to allow the lens 10 to be removed by forcing the lens 10 back over the second barrier, without damaging either the frame 50 or the lens 10.

According to another embodiment of the bezel, shown in FIG. 6, cross-section 56 comprises an external surface 71, an internal surface 72, a gasket receiving surface 79, a rear surface 73, and a front surface 74. The front surface 74 extends between a first end of the external surface 71 and a first end of the internal surface 72. The rear surface 73 extends between a second end of the external surface 71 and a first end of the gasket receiving surface 79, which is immediately adjacent and extends from a second end to a second end of the internal surface 72. The gasket receiving surface 79 is designed to receive a resiliently compressible gasket 78. Like the embodiment described above, the front and rear surfaces, 73 and 74, respectively, may be made up of more than one discrete sub-surfaces. FIG. 6 illustrates two discrete sub-surfaces for each front and rear surfaces 73 and 74. The intersection between the rear surface 73 and the second end of the inner surface 72 forms a first barrier having a certain height. The intersection between the front surface 74 and the first end of the gasket receiving surface 79 forms a second barrier having a height that is less than the height of the first barrier. The portion of the cross section defined as being between the rear surface 73 and the gasket receiving surface 79 is substantially flexible with the gasket 78 providing resilient return to shape.

In this embodiment, the lens 10 is pushed or forced into the bezel, over the second barrier, which deforms under the pressure of the lens insertion. The first barrier is sufficiently high to prevent the lens 10 from being pushed all of the way through the frame 50. The second barrier, further, is of sufficient height, and resilience due to the gasket 78, to allow the lens 10 to be removed by forcing the lens 10 back over the second barrier, without damaging either the frame 50 or the lens 10.

Figure 8:
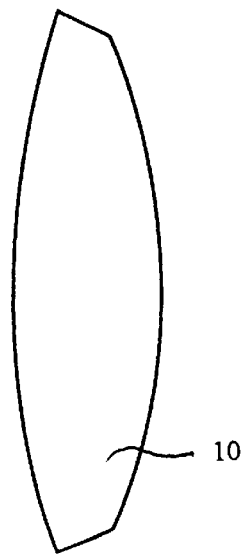
FIG. 8 illustrates one possible cross section for the lens according to the present invention.
Figure 9:
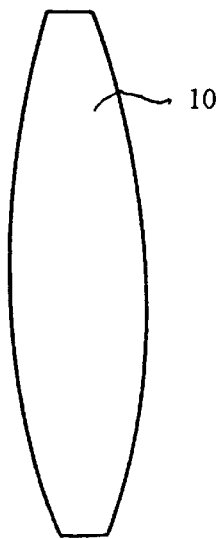
FIG. 9 illustrates another possible cross section for the lens according to the present invention.
Figure 10:
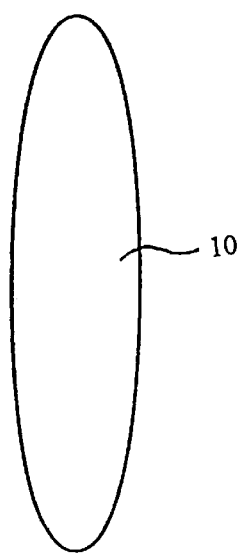
FIG. 10 illustrates a further possible cross section for the lens according to the present invention.

In both of the above embodiments, the lenses 10 may have a variety of cross sectional shapes as illustrated in FIGS. 8–10. FIG. 8 illustrates a beveled periphery; FIG. 9 illustrates a flat or girdled periphery; and FIG. 10 illustrates a curved periphery. It is preferred, when using these different cross sectional shapes, that the inner surfaces, 62 and 72, respectively, should substantially match the shape of the periphery of the lens. All of the shapes or cross sections envisioned for the present invention, however, must allow for the lens to be forced over the second barriers, in both directions.

Figures 7A, 7B:
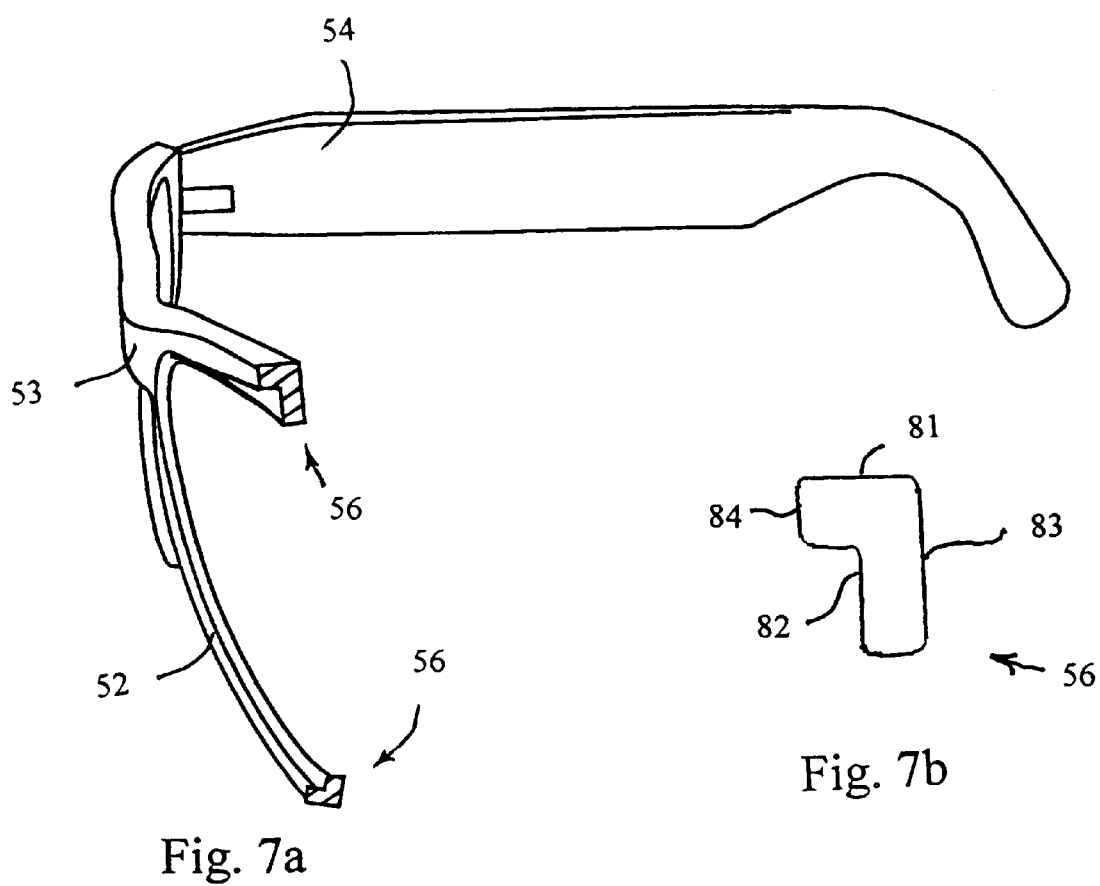

According to a further embodiment of the bezel, shown in FIGS. 7a and 7b, cross section 56 comprises an exterior surface 81, and interior surfice 82, a rear surface 83 and a front surface 84. The front surface 84 extends between a first end of the external surface 81 and a first end of the interior surface 82. The rear surface 83 extends between a second end of the external surface 81 and a second end of the interior surface 82. The interior surface 82 can comprise more than one discrete sub-surface.

Figure 12:
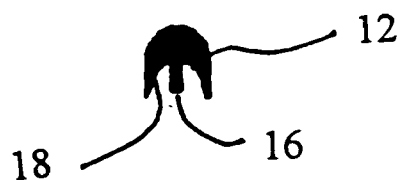
FIG. 12 is a cross section of the lens gasket, according the embodiment of FIG. 11.
Figure 11:
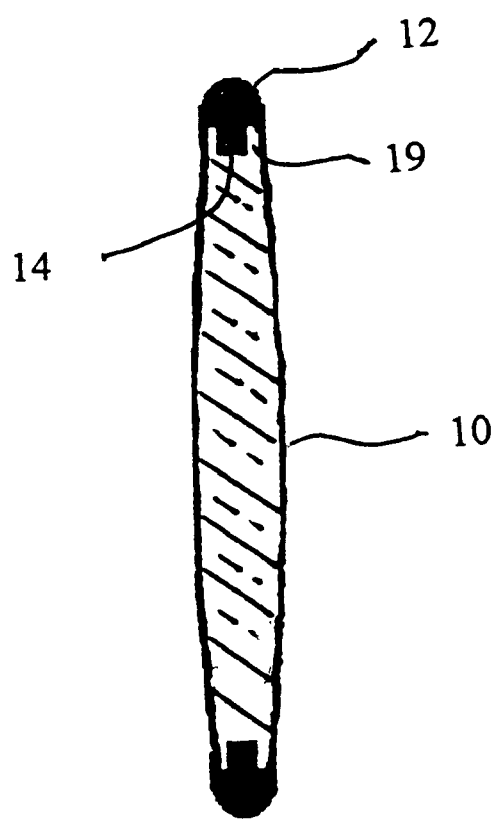
FIG. 11 shows an embodiment of the lens and gasket assembly in which the gasket is attached to the periphery of the lens.

In this embodiment, the lens 10 is substantially friction fit into the bezel. Preferably, the lens 10 includes a lens gasket 12 that is attached to the periphery of the lens 10. FIGS. 11 and 12 illustrate the lens 10 and lens gasket 12 assembly.

The lens 10 in these figures includes a periphery having a groove or channel 14 adapted to receive a projecting portion 16 of the gasket 12. The gasket 12 may further include a pair of channels 18, each located on opposite sides of the projecting portion 16 and adapted to receive possible projections 19 of the lens periphery. Thus, when the channel 14 in the lens periphery receives the projecting portion 16 of the gasket 12, the gasket 12 is held securely in place. Alternately, channel 14 and the projections 19 may be located on an inner diameter of gasket 12 with the projecting portion 16 and pair of channels 18 commensurately located on the periphery of the lens 10. This assembly is then capable of being friction fitted into the bezel of the eyepieces 52. It is important to note that the exact cross sectional outline of gasket 12 need not be circular. Other suitable shapes, such as rectangular, bevel, oval, electrical etc., fall within the scope of the present invention as long as they provide frictional surface contact area with the frame bezel. It is particularly advantageous, for style and cosmetic purposes for the gasket to be available in a variety of different colors.

In all of the above embodiments, it is important that the lens 10 be received into the eyepieces 52 from the front side of the frame 50 for cosmetic purposes. Additionally, for mechanical purposes, since the front side of the frame member 55 is typically convex in shape the distance across the lens opening 51, as measured from the second barrier is greater than the distance as measured from across the first barrier, thereby making it easier to place and replace the lenses 10 from the front.

While these descriptions directly describe the above embodiments, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

What is claimed is:

1. An eyewear frame comprising a frame member having a pair of eyepieces attached to each other by a bridge with a pair of pivotally attached earpieces, said pair of pivotally attached earpieces being located at opposite ends of the frame member, said eyepieces further having a bezel with an external surface, an internal surface, a front surface that extends between and intersects a first end of the external surface and a first end of the internal surface, and a rear surface that extends between and intersects a second end of the external surface and a second end of the internal surface, the bezel of the eyepiece is adapted to removably receive, by inserting from a front side of the frame member, a lens having a resiliently compressible gasket attached to a peripheral edge of the lens, said gasket provides flexibility for insertion when the lens is received into the eyepiece.

2. The eyewear frame of claim 1 wherein the intersection between the front surface and the interior surface forms a first barrier, and the intersection between the rear surface and the interior surface forms a second barrier, the second barrier having a greater height than that of the first barrier, whereby when a lens is inserted into the bezel, it must be forced over the barrier, which is slightly flexible and the height of the second barrier prevent the lens from being pushed through the eyepiece.

3. The eyewear frame of claim 2 wherein a gasket receiving surface is interposed between the front surface and the interior surface, and the resiliently compressible gasket received into the gasket receiving surface, whereby the gasket provides flexibility to the first barrier when the lens is receive into the eyepiece.

4. The eyewear frame of claim 3 in combination with a pair of lenses with attached gaskets, each gasket having a cross section that is received by the bezel of each of the pair of eyepieces.

5. The eyewear frame of claim 2 in combination with a pair of lenses with attached gaskets, each gasket having a cross section that is received by the bezel of each of the pair of eyepieces.

6. An eyewear frame and lens set comprising at least one pair of lenses in combination with a frame member having a pair of eyepieces attached to each other by a bridge with a pair of pivotally attached earpieces, said pair of pivotally attached earpieces being located at opposite ends of the frame member, said eyepieces further having a bezel with an external surface, an internal surface, a front surface that extends between and intersects a first end of the external surface and a first end of the internal surface, and a rear surface that extends between and intersects a second end of the external surface and a second end of the internal surface, the bezel of the eyepiece is adapted to removably receive by inserting from a front side of the frame member a lens, each lens of the at least one pair of lens further comprises a lens with a gasket attached to the periphery of the lens, the gasket for frictionally interacting with the bezel of the eyepiece to removably secure the lens.

7. The eyewear frame and lens set of claim 6 wherein the lens further includes a channel located on the periphery, thus forming a pair of projections located on either side of the channel, and the gasket further includes a projecting portion that is adapted to be received by the channel in the lens.

8. The eyewear frame and lens set of claim 6 wherein the gasket further includes a channel located on an inner diameter, thus forming a pair of projections located on either side of the channel, and the lens further includes a projecting portion located on the periphery that is adapted to be received by the channel in the gasket.

9. An eyewear frame and lens set comprising at least one pair of lenses in combination with a frame member having a pair of eyepieces attached to each other by a bridge with a pair of pivotally attached earpieces, said pair of pivotally attached earpieces being located at opposite ends of the frame member, said eyepieces further having a bezel with an external surface, an internal surface, a front surface that extends between and intersects a first end of the external surface and a first end of the internal surface, and a rear surface that extends between and intersects a second end of the external surface and a second end of the internal surface, wherein the bezel of the eyepiece is adapted to removably receive by inserting from a front side of the frame member a lens of the at least one pair of lenses, each lens of the at least one pair of lens further comprises a lens with a gasket attached to the periphery of the lens, the lens further includes a channel located on the periphery, thus forming a pair of projections located on either side of the channel, and the gasket further includes a projecting portion that is adapted to be received by the channel in the lens, each lens adapted to be secured into one of the pair of eyepieces by friction.

* * * * *